Patented May 6, 1947

2,420,194

UNITED STATES PATENT OFFICE 2,420,194

REACTION PRODUCT OF A POLYETHYLENI-CALLY UNSATURATED POLYMER AND A CARBOTHIOLIC ACID

Lawrence Marion Richards, Wilmington, Del., assignor to E. I. du Pont de Nemours & Company, Wilmington, Del., a corporation of Delaware No Drawing. Application December 27, 1943
Serial No. 515,807

7 Claims. (Cl. 260—79)

This invention relates to polymeric organic compounds and more particularly to sulfur-containing derivatives of polymeric unsaturated compounds.

Carbothiolic acids, such as thiolacetic acid, have been added to monomeric unsaturated organic compounds, but have not hitherto been added to unsaturated polymeric substances. This invention has, therefore, as an object a process for the addition of carbothiolic acids to unsaturated polymeric substances. A further object is the addition of carbothiolic acids to polymers of diene hydrocarbons. Another object is the addition of carbothiolic acids to polymers of conjugated diene hydrocarbons. Other objects will appear hereinafter.

These objects are accomplished by the following invention wherein an organic polymer having a plurality of unsaturated (ethylenic) linkages and an iodine number of at least 25 is reacted, preferably in the presence of a peroxy compound and/or of molecular oxygen, in solution in an inert organic solvent, e. g. benzene, at a temperature ranging from atmospheric temperature, i. e. about 20° C., to the decomposition temperature of the carbothiolic acid with a carbothiolic acid.

In general, the carbothiolic acid is used in an amount of at least 10% of the weight of the polymer being employed, and preferably from 75 to 150% by weight of the polymer being treated, when the reaction is catalyzed by oxygen and from 50 to 100% by weight of the polymer when an organic peroxide is the catalyst.

The more detailed practice of the invention is illustrated by the following examples. There are, of course, many forms of the invention other than these specific embodiments.

Example I

Eighteen grams of natural rubber is dissolved in sufficient benzene to make a 10% solution. To this solution is added 24.4 grams of thiolacetic acid, $CH_3COSH$, (assuming the rubber to be a polyisoprene, this amount of thiolacetic acid is 1.2 times that theoretically required to saturate all of the double bonds, i. e. one per isoprene unit), and the reaction mixture is kept 15 hours at 60° C., and for 3.5 hours at 100° C. During this reaction period the reaction vessel is opened periodically and the contents exposed to the air. The clear, yellow solution is removed and part is cast onto a plate. The film is stripped from the plate and baked at 60° C. in an oven. The product is soluble in benzene.

From the remaining portion of the reaction product, the solvent is removed by evaporation and sulfur analysis of the recovered material shows it to contain 3.3% sulfur, which corresponds to about 8% of thiolacetic acid in the product. This corresponds to a saturation of 7.5% of the double bonds in the rubber. A long fiber of this material is immersed for 24 hours in alcoholic potassium hydroxide and washed with water and acetic acid. The treated product is soluble in benzene. Another portion of the product is immersed for 24 hours in alcoholic potassium hydroxide, and washed with water and acetic acid, and then treated with dilute hydrogen peroxide. The product thus obtained, in contrast to the above, is insoluble in benzene.

Example II

Eighteen grams of natural rubber is dissolved in sufficient benzene to yield a 10% solution. To this solution is added 24.4 grams of thiolacetic acid and the reaction mixture heated for 15 hours at 60° C. and then for a total of 15.5 hours at 100° C. During this reaction period the reaction vessel is opened periodically and the contents exposed to the air. The solution is run in a thin stream into methanol and the coagulated, rubbery product is washed by decantation. The washed material is a sticky solid which is soluble in benzene. Analysis of this material shows the presence of 3.3% sulfur, from which it may be calculated that 7.5% of the double bonds in the rubber have been saturated.

The modified rubber prepared as described above can be hydrolyzed by treatment with alcoholic potassium hydroxide and the resulting product insolubilized by treatment with an oxidizing agent.

Example III

Eleven grams of the thiolacetylated rubber prepared as described in Example (II) is dissolved in 100 grams of benzene and 30 grams of ethanol. This solution is heated and stirred under nitrogen while 0.7 gram of potassium hydroxide in 30 grams of absolute ethanol is added. The mixed solvents are largely removed by distillation and the viscous residue is treated with 1 gram of acetic acid to neutralize the basic catalyst. Clear films are readily formed by solvent evaporation and gradually become insoluble upon prolonged exposure to air.

Example IV

Fourteen grams of smoked sheet rubber, 126 grams of benzene and 19 grams of thiolacetic acid are heated at 100° C. in a closed vessel under air for 18 hours. The vessel is then cooled to a temperature below 80° C. and the contents stirred in the presence of air to saturate the solution with oxygen. The vessel is then closed and reheated at 100° C. for 24 hours to give a clear orange solution. Attempts to precipitate the thiolacetylated rubber show that the product is fairly soluble in methanol. The benzene solution is treated with methanol and 1 gram of 85% phosphoric acid. The mixture is stirred and refluxed under nitrogen to give a benzene solution of a thiol containing rubber. This solution can be used as a coating material or paint ingredient and possesses the advantage of insolubilization upon exposure to air.

In place of sodium and potassium hydroxides any alkaline earth metal hydroxide can be used to catalyze the hydrolysis of the polymeric carbothiolates. Alternately hydrolysis can be carried out with an acid particularly a mineral acid such as hydrochloric acid or phosphoric acids. When an alkali or alkaline earth metal hydroxide is used to catalyze the hydrolysis, the hydroxide is preferably used in the ration of about 2 to 10 moles per thiolcarboxylate unit present. If less is used, the hydroxide is neutralized by the acid formed and the hydrolysis is incomplete or very slow. When the hydrolysis is carried out in the presence of an acid, the amount of catalyst employed may conveniently be from 1 to .10% of the weight of carbothiolate unit present.

Methanol and ethanol are convenient solvents for the sodium or potassium hydroxide but other alcohols may be used. The concentration of alkali hydroxide in the alcohol may be varied widely but convenient concentrations are in the range of 5 to 25% by weight.

In the process of this invention there can be used any natural or synthetic polymeric material containing olefinic unsaturation. The polymers are polyunsaturated and have an unsaturation corresponding to an iodine number of at least 25. Examples of operable polymers in addition to natural rubber are the unsaturated condensation polymers such as the polyesters, polyethers, polysulfides, polyamide-polyesters, polyacetals, etc., prepared from components at least one of which contains an olefinic double bond; unsaturated alcohol-modified urea-formaldehyde, melamine-formaldehyde, and phenol-formaldehyde polymers; and the unsaturated derivatives of such film-forming materials as starch, polyvinyl alcohol, etc.; the linear diene polymers obtained by polymerizing diene hydrocarbons alone and in admixture with other polymerizable organic compounds. Examples of such dienes are butadiene-1,3, isoprene, dimethyl-2,3-butadiene-1,3 and the like. Examples of unsaturated organic compounds which can be polymerized with the above dienes are styrene, pinene, isoibutylene, monovinylacetylene, etc.; vinylethinyl alkyl carbinols, vinyl acetate, unsaturated aldehydes and ketones such as acrolein, methyl vinyl ketone, etc.; acrylic and methacrylic acids and their esters, nitriles and imides, e. g. butyl acrylate, methyl methacrylate, acrylonitrile, etc.; alpha-chloroacrylic acid and its esters, e. g. methyl-alpha-chloroacrylate, etc.; furylacrylic acid and its esters, e. g. methyl furylacrylate; etc.; esters of 1,4-butenedioic acids, such as dimethyl fumarate, etc.

The organic solvent soluble polymers are preferred in the practice of this invention because they react readily at moderate temperatures and yield products which are especially useful because they can be readily insolubilized during or after being formed into shaped objects. The organic solvent soluble polymers, including copolymers, of acrylic conjugated diene hydrocarbons constitute a particularly preferred embodiment since they react with carbothiolic acids with exceptional ease to give products especially useful as water-resistant coating compositions which can be made resistant to organic solvents by hydrolysis followed by oxidation.

The term "polymer" is used in the description and claims to refer to macromolecular organic compounds containing a plurality of recurring units.

In the practice of this invention any carbothiolic acid can be used. These acids have as their characteristic groups the carbothiolic, —CO.SH. group. In place of thiolacetic there can be used thiolpropionic acid, thiolbutyric acid, thiolhexanoic acid, thioldecanoic acid, thiolocanoic acid, thiolbenzoic acid, etc. The preferred acids, however, are the aliphatic carbothiolic acids and of these, thiolacetic acid is particularly preferred, because of its ready reactivity at ordinary temperatures and availability.

The process of this invention is generally carried out in the presence of molecular oxygen or in the presence of substances containing a peroxy linkage. Examples of suitable peroxy compounds are benzoyl peroxide, ascaridole, peracetic acid, perbenzoic acid, etc.

The process of this invention is generally carried out at atmospheric pressure and at temperatures ranging from atmospheric up to the decomposition temperature of the carbothiolic acid being used, which for thiolacetic acid is about 130–150° C.

In the practice of this invention the use of a solvent for the polymer and carbothiolic acid is essential to assure a practical rate of reaction. In place of the benzene of the examples there can be used other solvents such as toluene, xylene, gasoline, etc.

The products of this invention are useful as coating composition ingredients, in the preparation of films etc. They can also be hydrolyzed with alkalis or with acids and the resulting polymeric thiols insolubilized by oxidation with the formation of disulfide cross links. These cross-linked polymers are much more solvent resistant than the original polymers.

The above description and examples are intended to be illustrative only. Any modification or variation therefrom which conforms to the spirit of the invention is intended to be included with the scope of the claims.

What is claimed is:

1. Process which comprises reacting, in solution in an inert solvent and for a time of at least 18.5 hours, a polymeric organic compound having a plurality of ethylenic linkages and an iodine number of at least 25 with at least 10%, by weight of the polymer, of a carbothiolic acid which is hydrocarbon except for the carbothiolic group.

2. Process which comprises reacting, in solution in an inert organic solvent and for a time of at least 18.5 hours, a polymer, of iodine number of at least 25, of an aliphatic conjugated diene hydrocarbon of 4 to 6 carbon atoms with at least 10%, by weight of the polymer, of a carbothiolic acid which is hydrocarbon except for the carbothiolic group.

3. The product of the reaction, in an inert organic solvent for a time of at least 18.5 hours, of a polymer, of iodine number of at least 25, of an aliphatic conjugated diene hydrocarbon of 4 to 6 carbon atoms with at least 10%, by weight of the polymer, of a carbothiolic acid which is hydrocarbon except for the carbothiolic group.

4. The polymeric hydrolysis product of the polymeric product of the reaction, in solution in an inert solvent and for a time of at least 18.5 hours, of a polymer, of iodine number of at least 25, of an aliphatic conjugated diene hydrocarbon of 4 to 6 carbon atoms with at least 10%, by weight of the polymer, of a carbothiolic acid which is hydrocarbon except for the carbothiolic group.

5. Process for preparing sulfur containing polymers which comprises hydrolyzing the polymeric product of the reaction, in solution in an inert solvent and for a time of at least 18.5 hours, of a polymer, of iodine number of at least 25, of an aliphatic conjugated diene hydrocarbon of 4 to 6 carbon atoms with at least 10%, by weight of the polymer, of a carbothiolic acid which is hydrocarbon except for the carbothiolic group.

6. The polymeric oxidized hydrolysis product of the product of the reaction, in solution in an inert solvent and for a time of at least 18.5 hours, of a polymer, of iodine number of at least 25, of an aliphatic conjugated diene hydrocarbon of 4 to 6 carbon atoms with at least 10%, by weight of the polymer, of a carbothiolic acid which is hydrocarbon except for the carbothiolic group.

7. Process of preparing sulfur-containing polymers which comprises exposing to oxidation the polymeric hydrolysis product of the polymeric product of the reaction, in solution in an inert solvent and for a time of at least 18.5 hours, of a polymer, of iodine number of at least 25, of an aliphatic conjugated diene hydrocarbon of 4 to 6 carbon atoms with at least 10%, by weight of the polymer, of a carbothiolic acid which is hydrocarbon except for the carbothiolic group.

LAWRENCE MARION RICHARDS.

REFERENCES CITED

The following references are of record in the file of this patent:

UNITED STATES PATENTS

| Number | Name | Date |
|---|---|---|
| 2,234,204 | Starkweather | Mar. 11, 1941 |
| 2,191,266 | Williams | Feb. 20, 1940 |

FOREIGN PATENTS

| Number | Country | Date |
|---|---|---|
| 542,645 | British | Jan. 21, 1942 |
| 723,838 | French | Jan. 19, 1932 |

Certificate of Correction

Patent No. 2,420,194.　　　　　　　　　　　　　　　　May 6, 1947.

LAWRENCE MARION RICHARDS

It is hereby certified that errors appear in the printed specification of the above numbered patent requiring correction as follows: Column 3, line 62, for "isobutylene" read *isobutylene*; column 4, line 5, for "acrylic" read *acyclic*; and that the said Letters Patent should be read with these corrections therein that the same may conform to the record of the case in the Patent Office.

Signed and sealed this 15th day of July, A. D. 1947.

[SEAL]

LESLIE FRAZER,
*First Assistant Commissioner of Patents.* organic solvent for a time of at least 18.5 hours, of a polymer, of iodine number of at least 25, of an aliphatic conjugated diene hydrocarbon of 4 to 6 carbon atoms with at least 10%, by weight of the polymer, of a carbothiolic acid which is hydrocarbon except for the carbothiolic group.

4. The polymeric hydrolysis product of the polymeric product of the reaction, in solution in an inert solvent and for a time of at least 18.5 hours, of a polymer, of iodine number of at least 25, of an aliphatic conjugated diene hydrocarbon of 4 to 6 carbon atoms with at least 10%, by weight of the polymer, of a carbothiolic acid which is hydrocarbon except for the carbothiolic group.

5. Process for preparing sulfur containing polymers which comprises hydrolyzing the polymeric product of the reaction, in solution in an inert solvent and for a time of at least 18.5 hours, of a polymer, of iodine number of at least 25, of an aliphatic conjugated diene hydrocarbon of 4 to 6 carbon atoms with at least 10%, by weight of the polymer, of a carbothiolic acid which is hydrocarbon except for the carbothiolic group.

6. The polymeric oxidized hydrolysis product of the product of the reaction, in solution in an inert solvent and for a time of at least 18.5 hours, of a polymer, of iodine number of at least 25, of an aliphatic conjugated diene hydrocarbon of 4 to 6 carbon atoms with at least 10%, by weight of the polymer, of a carbothiolic acid which is hydrocarbon except for the carbothiolic group.

7. Process of preparing sulfur-containing polymers which comprises exposing to oxidation the polymeric hydrolysis product of the polymeric product of the reaction, in solution in an inert solvent and for a time of at least 18.5 hours, of a polymer, of iodine number of at least 25, of an aliphatic conjugated diene hydrocarbon of 4 to 6 carbon atoms with at least 10%, by weight of the polymer, of a carbothiolic acid which is hydrocarbon except for the carbothiolic group.

LAWRENCE MARION RICHARDS.

REFERENCES CITED

The following references are of record in the file of this patent:

UNITED STATES PATENTS

| Number | Name | Date |
|---|---|---|
| 2,234,204 | Starkweather | Mar. 11, 1941 |
| 2,191,266 | Williams | Feb. 20, 1940 |

FOREIGN PATENTS

| Number | Country | Date |
|---|---|---|
| 542,645 | British | Jan. 21, 1942 |
| 723,838 | French | Jan. 19, 1932 |

Certificate of Correction

Patent No. 2,420,194.                                    May 6, 1947.

LAWRENCE MARION RICHARDS

It is hereby certified that errors appear in the printed specification of the above numbered patent requiring correction as follows: Column 3, line 62, for "isobutylene" read *isobutylene*; column 4, line 5, for "acrylic" read *acyclic*; and that the said Letters Patent should be read with these corrections therein that the same may conform to the record of the case in the Patent Office.

Signed and sealed this 15th day of July, A. D. 1947.

[SEAL]

LESLIE FRAZER,
*First Assistant Commissioner of Patents.*